United States Patent
Rasa

(10) Patent No.: US 10,052,689 B2
(45) Date of Patent: Aug. 21, 2018

(54) JETTING DEVICE

(71) Applicant: Océ-Technologies B.V., Venlo (NL)

(72) Inventor: Mircea Rasa, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 201 days.

(21) Appl. No.: 15/215,184

(22) Filed: Jul. 20, 2016

(65) Prior Publication Data

US 2017/0028467 A1 Feb. 2, 2017

(30) Foreign Application Priority Data

Jul. 28, 2015 (EP) .................................... 15178689

(51) Int. Cl.
| | | |
|---|---|---|
| *B22D 45/00* | (2006.01) | |
| *F27D 3/14* | (2006.01) | |
| *F15D 1/00* | (2006.01) | |
| *B41J 2/04* | (2006.01) | |
| *B22F 3/115* | (2006.01) | |
| *B22F 3/105* | (2006.01) | |
| *B22F 9/08* | (2006.01) | |

(52) U.S. Cl.
CPC ............ *B22D 45/005* (2013.01); *B22F 3/115* (2013.01); *B41J 2/04* (2013.01); *F15D 1/0075* (2013.01); *F27D 3/14* (2013.01); *B22F 2003/1056* (2013.01); *B22F 2009/0892* (2013.01); *B22F 2999/00* (2013.01); *B41J 2002/041* (2013.01); *B41J 2202/04* (2013.01); *Y02P 10/295* (2015.11)

(58) Field of Classification Search
CPC .......... B22F 3/115; B22D 45/005; B41J 2/04; F15D 1/0075; F27D 3/14
USPC ................ 222/590, 592, 593, 594; 266/236; 164/46
See application file for complete search history.

(56) References Cited

U.S. PATENT DOCUMENTS

| | | | |
|---|---|---|---|
| 6,234,608 B1 * | 5/2001 | Genovese ................... | B41J 2/14 347/54 |
| 8,444,028 B2 * | 5/2013 | Rasa ........................ | B22F 9/082 222/591 |
| 2010/0085405 A1 | 4/2010 | Indorsky et al. | |
| 2011/0285792 A1 * | 11/2011 | Byun .......................... | B41J 2/06 347/54 |

(Continued)

FOREIGN PATENT DOCUMENTS

| | | |
|---|---|---|
| EP | 2 547 527 B1 | 11/2014 |
| JP | 2000-52005 A | 2/2000 |

(Continued)

*Primary Examiner* — Jessee R Roe
*Assistant Examiner* — Michael Aboagye
(74) *Attorney, Agent, or Firm* — Birch, Stewart, Kolasch & Birch, LLP

(57) ABSTRACT

A jetting device includes: a fluid chamber connected to a nozzle and containing an electrically conductive liquid to be jetted out through the nozzle; a magnetic field generator arranged to create a magnetic field in the fluid chamber; a pair of electrodes contacting the electrically conductive liquid in the fluid chamber; and a controller arranged to control a flow of an electric current through the electrodes and the electrically conductive liquid. The magnetic field generator is arranged to create a rotating magnetic field in the fluid chamber.

5 Claims, 3 Drawing Sheets

(56) References Cited

U.S. PATENT DOCUMENTS

2014/0217134 A1\* 8/2014 Rasa .......................... B41J 2/04
                                                            222/590
2016/0256888 A1\* 9/2016 Rasa ................... B05B 17/0653

FOREIGN PATENT DOCUMENTS

JP      2000-176613 A     6/2000
WO   WO 2010/063576 A1   6/2010

\* cited by examiner

JETTING DEVICE

The invention relates to a jetting device comprising:
a fluid chamber connected to a nozzle and containing an electrically conductive liquid to be jetted-out through the nozzle;
a magnetic field generator arranged to create a magnetic field in the fluid chamber;
a pair of electrodes contacting the electrically conductive liquid in the fluid chamber; and
a controller arranged to control a flow of an electric current through the electrodes and the electrically conductive liquid.

BACKGROUND OF THE INVENTION

WO 2010/063576 A1 discloses a jetting device of this type which is used for jetting molten metal such as copper, silver, gold, and the like. The magnetic field generator creates a magnetic field that extends at right angles to a flow direction of the liquid when the liquid flows to the nozzle. The electrodes are arranged to create an electric current that is normal to both the magnetic field and the flow direction of the liquid. As a consequence, the electrically conductive liquid is subject to a Lorentz force that accelerates the liquid towards the nozzle, so that, when the electric current is applied in the form of a pulse sequence, droplets of the molten metal are jetted out from the nozzle.

In such a device, the jetting stability may be compromised by small impurities and in particular by small gas bubbles in the liquid in the fluid chamber.

It is an object of the invention to provide a jetting device that permits a maintenance operation for maintaining a high jetting stability.

In order to achieve this object, the magnetic field generator is arranged to create a rotating magnetic field in the fluid chamber.

When a rotating magnetic field passes through a solid or liquid body of an electrically conductive material, the magnetic field induces eddy currents in the conductive medium, with the result that an electromagnetic interaction between the medium and the magnetic field causes the medium to co-rotate with the magnetic field. Thus, by creating a rotating magnet field in the fluid chamber, it is possible to create a vortex flow of the electrically conductive liquid in the fluid chamber. As a consequence, centrifugal forces urge the liquid outwardly against the peripheral wall of the fluid chamber, and gas bubbles that may have adhered to that wall will be detached from the wall and displaced inwardly where they may float up to the surface of the liquid, so that they are eventually removed from the fluid chamber. In this way, whenever it is observed or feared that the jetting stability of the device may be compromised by gas bubbles, these bubbles can easily be removed by switching the device temporarily into a maintenance mode in which the rotating magnet field is created. Since the device has a magnetic field generator, anyway, for producing the Lorentz force that accelerates the liquid towards the nozzle, only a little modification of the existing magnetic field generator is necessary for enabling this generator to create a rotating magnetic field.

Gas bubbles may be present in the fluid chamber, for example due to the presence of dissolved gas in the metal, or due to gas entering the fluid chamber via the nozzle. The presence of gas bubbles in the fluid chamber may hamper the jetting process and is therefore disadvantageous.

In an embodiment, the jetting device may comprise a detection unit for detecting presence of a gas bubble in the fluid chamber. Such detection unit is described in detail in EP 2547527, which is herein incorporated by reference. Such detection unit may be an electrical signal detecting unit for detecting a resulting electrical current, which resulting electrical current is induced by a residual pressure wave in the part of the conductive fluid positioned in the magnetic field, thereby obtaining a detection signal. When a droplet of fluid is ejected, differences in pressure are generated throughout the fluid and a pressure wave is created. Due to inertia, the pressure wave does not disappear momentarily as soon as the application of the electrical current is stopped, but will gradually fade in the course of time. The residual pressure wave as a function of time will depend, amongst others, on the acoustic behavior of the fluid chamber. The pressure wave will generate motion in the conductive fluid, which will fade in the course of time, like the pressure wave. The motion in the conductive fluid generates a force. Thus, after ejection of a droplet, a force is generated in the fluid. Since the conductive fluid is positioned in a magnetic field, an induced current ($\vec{I}$) is generated in the fluid, because of the relation $\vec{F}=\vec{I}\times\vec{B}$. By measuring this current, the acoustics in the actuation chamber may be monitored. By monitoring the residual pressure wave, the presence of a gas bubble can be detected. When a gas bubble is detected, a rotating magnetic field may be generated in the molten metal to remove the gas bubble. A control unit may be provided that is operatively connected to the detection unit. The control unit may control the magnetic field based on an input signal of the detection unit.

The rotating magnetic field may be generated using a plurality of magnetic field generating units. A magnetic field generating unit may comprise a magnet and/or a magnetic field concentrator. Preferably, the rotating magnetic field may be generated using at least two pairs of magnetic field generating units.

Useful details and further developments of the invention are indicated in the dependent claims.

In order to create the rotating magnetic field, the magnetic field generator may simply be rotated about the axis of the fluid chamber and the nozzle. In another embodiment, the magnetic field generator may be arranged to create at least two non-parallel magnetic fields the respective strengths of which can be modulated such that a torque is applied to the electrically conductive liquid. For example, two electromagnets may be provided for creating magnetic fields that are orthogonal to one another and these two electromagnets may be driven with sinusoidal currents with a phase difference of 90°. The result will be a magnetic field that rotates continuously and with constant angular velocity. It is however not prerequisite that the magnetic field rotates continuously and with constant angular velocity. In other embodiments, the magnetic field may be switched on and off intermittently and, while it is switched on, may be rotated through an angle of less than 360°.

In jet another embodiment, the magnetic field generator may comprise a combination of electromagnets and movable permanent magnets. For example, when permanent magnets are used for creating a stationary magnetic field in a first direction for producing the Lorentz force during the jetting operation, an electromagnet may be used for modulating that field, and another electromagnet may be used for creating a magnetic field in a second direction normal to the first direction.

The magnetic field generator may be controlled such that the angular velocity of the rotating magnetic field is increased gradually in order to gently accelerate the vortex flow of the liquid in the fluid chamber.

BRIEF DESCRIPTION OF THE DRAWINGS

Embodiment examples will now be described in conjunction with the drawings, wherein.

DETAILED DESCRIPTION OF THE DRAWINGS

Figure 1:
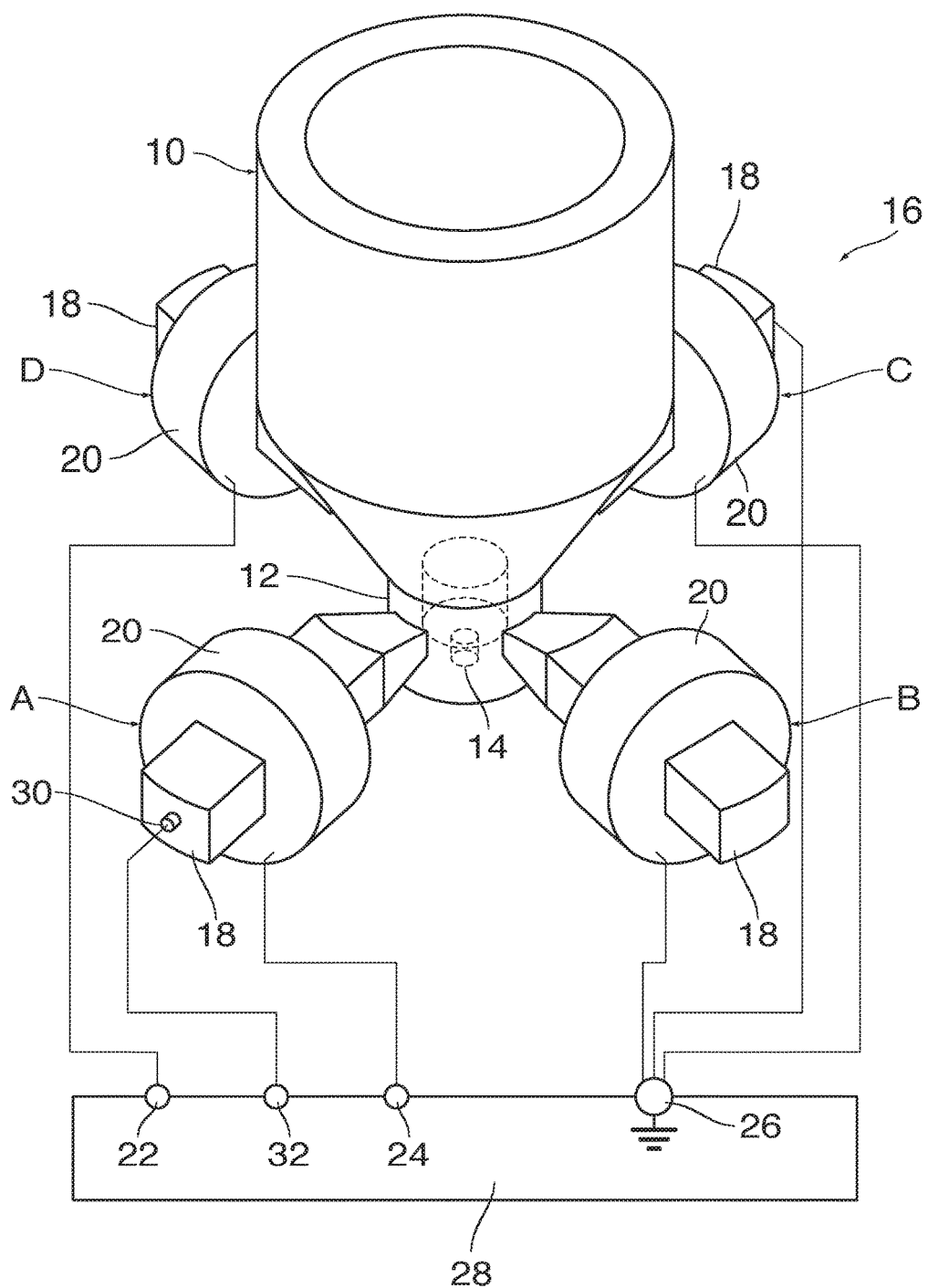
FIG. 1 is a schematic perspective view of a jetting device according to an embodiment of the invention.

The jetting device shown in FIG. 1 comprises a crucible 10 that has the shape of an inverted truncated cone and tapers towards a cylindrical fluid chamber 12 that opens out into a nozzle 14 at the bottom end.

The crucible 10 contains an electrically conductive liquid to be jetted, e.g. a molten metal. The walls of the crucible may contain heating elements (not shown) for keeping the metal in the molten state.

The entire device is preferably kept in an inert gas atmosphere, e.g. an argon atmosphere, in order to prevent the molten metal from being oxidized.

A magnetic field generator 16 is disposed around the outer periphery of the fluid chamber 12 and comprises four pairs of magnetic field concentrators 18 arranged at angular intervals of 90° in a horizontal plane, i.e. a plane orthogonal to the common central axis of the fluid chamber 12 and the nozzle 14. The field concentrators 18 are formed of a magnetisable material. In the example shown, each field concentrator 18 is surrounded by a solenoid 20, so that the field concentrator 18 forms the core of an electromagnet designated as A, B, C, and D, respectively.

The solenoids 20 of the diametrically opposite electromagnets A and C are electrically connected in series, and the solenoids 20 of the other pair of electromagnets B and D are also electrically connected in series. Each pair of electromagnets is connected between an output terminal 22 and 24, respectively, and a ground terminal 26 of a controller 28.

The field concentrator 18 of the electromagnet A includes an electrode 30 that is electrically isolated from the field concentrator 18 and passes through the entire length of the field concentrator and through the wall of the fluid chamber 12 so as to be in electric contact with the molten metal in the fluid chamber. The electrode 30 is connected to an output terminal 32 of the controller 28. The field concentrator 18 of the opposing electromagnet C has also an electrode 34 (FIG. 2) which is electrically connected to the ground terminal 26.

Thus, the controller 28 may energize the pairs of electromagnets A, C and B, D, respectively, and may also control an electric current flowing through the electrodes 30 and 34 and through the electrically conductive liquid in the fluid chamber 12.

Figure 2:
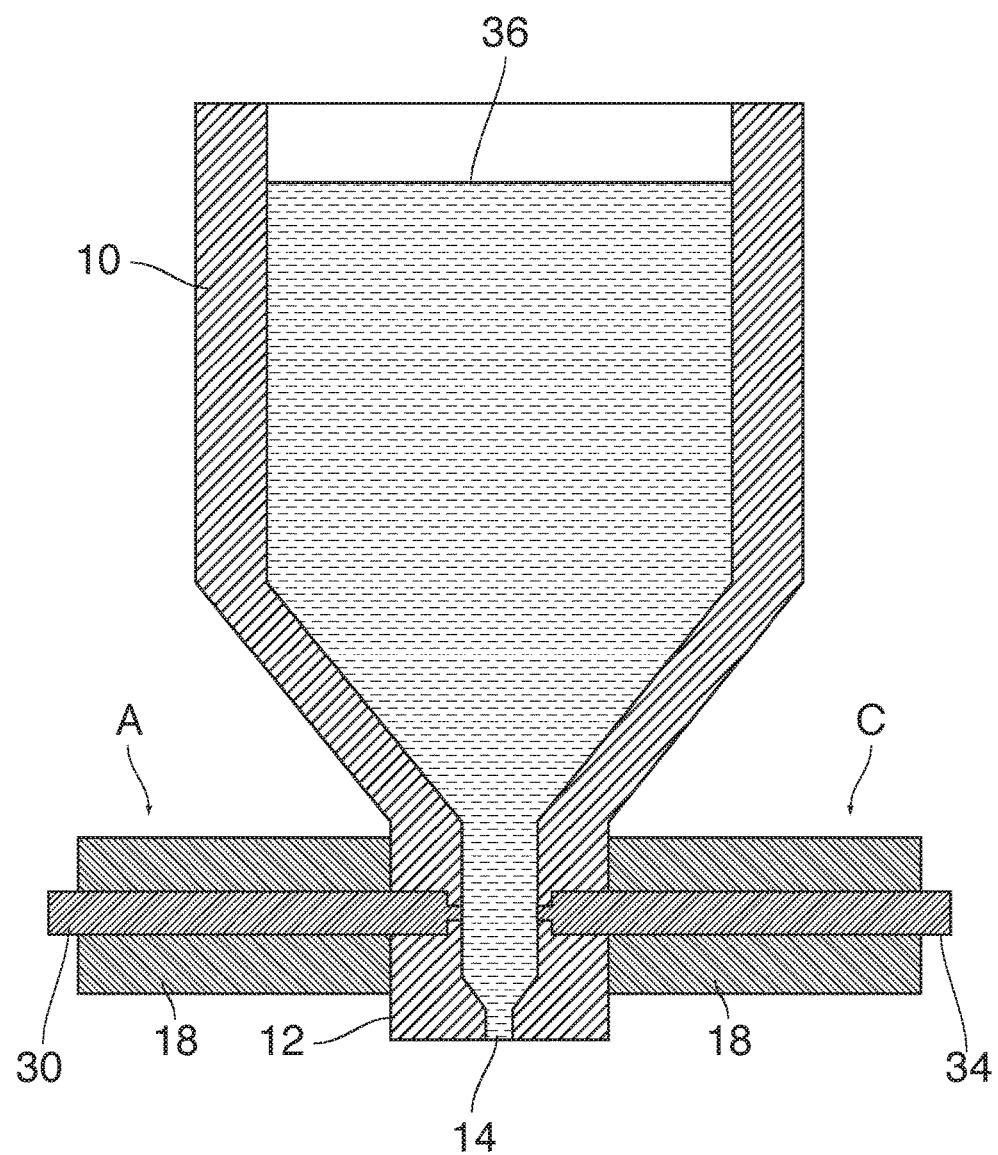
FIG. 2 is a longitudinal section of the jetting device shown in FIG. 1.

In FIG. 2, it can be seen how the electrodes 30, 34 contact the conductive liquid which is designated by the reference numeral 36. When the jetting device is operated for jetting out droplets of the liquid 36 through the nozzle 14, the electromagnets B and D, which are not visible in FIG. 2, create a magnetic field that passes through the fluid chamber 12 in the direction normal to the plane of the drawing in FIG. 2. When a current pulse is passed through the electrodes 30, 34, the liquid in the fluid chamber 12 is subject to a Lorentz force that is directed downwardly and thus causes a droplet of the liquid 36, i.e. of the molten metal, to be jetted out from the nozzle. The electromagnets A and C may be switched off in this mode of operation.

Figure 3:
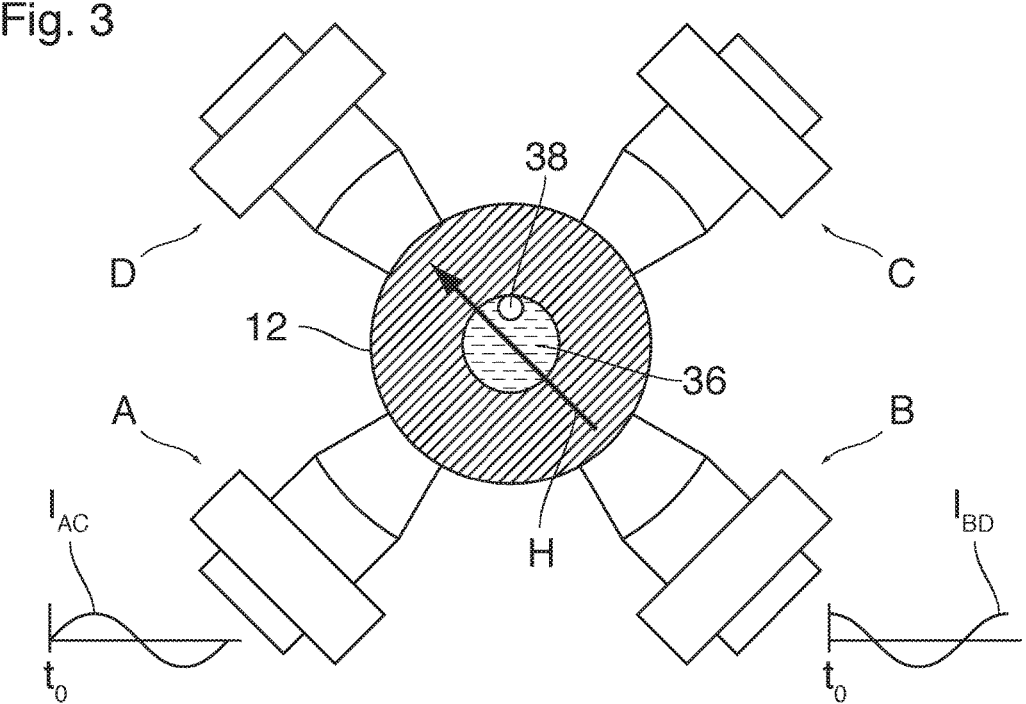
FIGS. 3 and 4 are schematic top plan views of the jetting device, illustrating the creation of a rotating magnetic field.

FIG. 3 shows a schematic cross-section of the fluid chamber 12 and illustrates a situation where the liquid 36 in the fluid chamber contains a gas bubble 38 (a bubble of argon gas in this example) that adheres to the peripheral wall of the fluid chamber. In order to detach and remove the bubble 38, the controller 28 is switched into a maintenance mode in which the electromagnets A and C are energized with a sinusoidal current $I_{AC}$, as has been shown diagrammatically in FIG. 3. The electromagnets B and D are energized with a sinusoidal current $I_{BD}$ which has a phase offset of 90° relative to the current $I_{AC}$. At a certain time instant $t_0$, the current $I_{AC}$ is zero, and the current $I_{BD}$ has its maximum value, resulting in a magnetic field H that is created only by the electromagnets B and D and is therefore parallel to the common axis of these electromagnets. However, due to the modulation of the currents $I_{AC}$ and $I_{BD}$ the field H will rotate clock-wise in FIG. 3.

Figure 4:
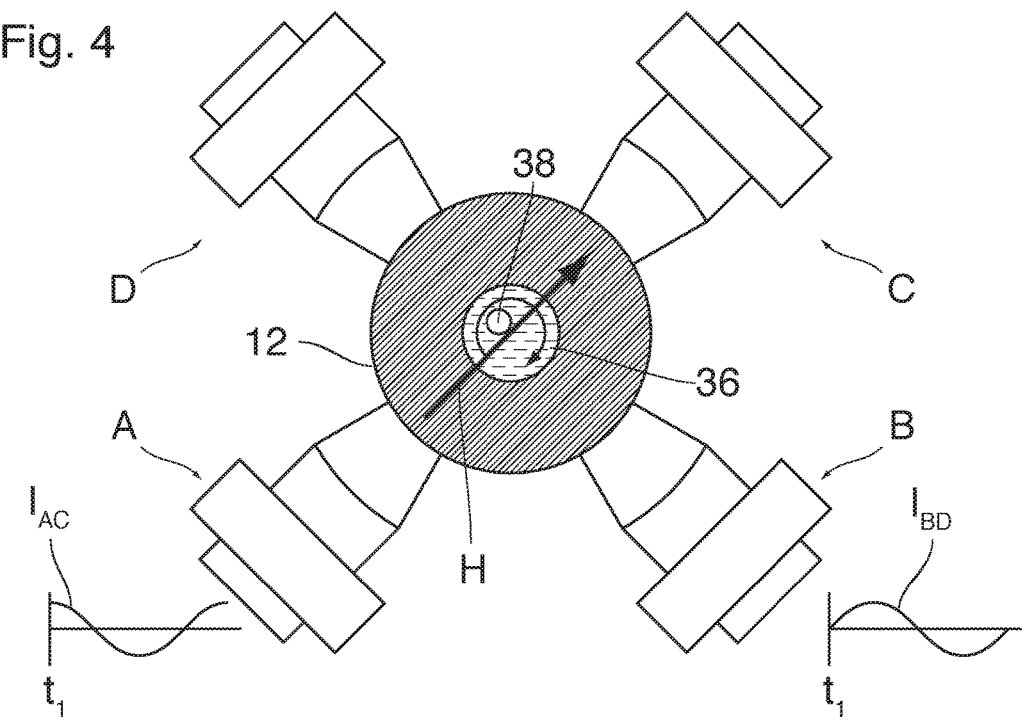

FIG. 4 illustrates the situation at a time $t_1$ where the current $I_{AC}$ has its maximum and the current $I_{BD}$ is zero. Consequently, the magnetic field H has been rotated by an angle of 90°. In the course of time, the magnetic field H will continue to rotate and will thereby induce eddy currents in the liquid 36. These eddy currents induce secondary magnetic fields in the liquid 36, and due to interaction between these magnetic fields and the rotating field H, the liquid 36 is caused to co-rotate with the magnetic field H.

The liquid 36 rotating in vortex fashion in the fluid chamber 12 is subject to centrifugal forces, with the result that the gas bubble 38, the density of which is considerably smaller than that of the liquid, is urged radially inwardly towards the central axis of the fluid chamber 12 and is thereby detached from the peripheral wall of the fluid chamber. Then, gravitational forces will cause the bubble 38 to float upwards into the crucible 10 and eventually to the top surface of the liquid. In this way, any gas bubbles in the fluid chamber 12 can be removed efficiently.

The angular velocity with which the magnetic field H rotates may easily be varied by appropriately controlling the frequencies of the currents $I_{AC}$ and $I_{BD}$.

In the example that has been described so far, the stationary magnetic field that produces the Lorentz force in the operating mode of the device is created by the electromagnets A and C. In a modified example, this stationary magnetic field may be created by means of permanent magnets which may be attached to the outer ends of the field concentrators 18 of these electromagnets A, C. In the maintenance mode, it is preferable to remove these permanent magnets because the stationary magnetic field would counteract the vortex flow of the liquid that is to be induced with the rotating magnetic field.

In yet another embodiment the field concentrators 18 of the electromagnets A and C may themselves be permanent magnets which create the static magnetic field. Then, in the maintenance mode, the electromagnets A and C would be energized to create a magnetic field with a polarity opposite to that of the permanent magnets. Consequently, at times where the current $I_{AC}$ has its maximum, the magnetic field of the permanent magnets will be largely suppressed. The current curve for the current curve $I_{AC}$ may be offset such that the current oscillates between zero and the maximum value. The current $I_{BD}$ is caused to oscillate about zero with the same amplitude as the current $I_{AC}$, so that the combined effect of the four electromagnets and the permanent magnets will create a rotating magnetic field just as in FIGS. 3 and 4. This embodiment has the advantage that no current has to flow through the electromagnets A and C in the operating mode.

The invention claimed is:

1. A method of removing gas bubbles from a fluid chamber of a jetting device, the device comprising:
   a fluid chamber connected to a nozzle and containing an electrically conductive liquid to be jetted-out through the nozzle;
   a magnetic field generator arranged to create a magnetic field in the fluid chamber;
   a pair of electrodes contacting the electrically conductive liquid in the fluid chamber; and
   a controller arranged to control a flow of an electric current through the electrodes and the electrically conductive liquid,
   wherein the magnetic field generator includes at least one electromagnet, and
   wherein the magnetic field generator comprises a first magnet assembly arranged to create a magnetic field in a first direction normal to an axis of the nozzle, and a second magnet assembly arranged to create a magnetic field in a second direction normal to the axis of the nozzle and normal to said first direction, and the controller is arranged to modulate the magnetic fields created by the first and second magnet assemblies,
   the method comprising the step of controlling the magnetic field generator to rotate the magnetic field in the fluid chamber.

2. The method according to claim 1, further comprising a step of varying an angular velocity with which the magnetic field is rotated.

3. A jetting device comprising:
   a fluid chamber connected to a nozzle and containing an electrically conductive liquid to be jetted-out through the nozzle;
   a magnetic field generator arranged to create a magnetic field in the fluid chamber;
   a pair of electrodes contacting the electrically conductive liquid in the fluid chamber; and
   a controller arranged to control a flow of an electric current through the electrodes and the electrically conductive liquid,
   wherein the magnetic field generator is arranged to create a rotating magnetic field in the fluid chamber,
   wherein the magnetic field generator includes at least one electromagnet, and
   wherein the magnetic field generator comprises a first magnet assembly arranged to create a magnetic field in a first direction normal to an axis of the nozzle, and a second magnet assembly arranged to create a magnetic field in a second direction normal to the axis of the nozzle and normal to said first direction, and the controller is arranged to modulate the magnetic fields created by the first and second magnet assemblies.

4. The jetting device according to claim 3, wherein the controller is arranged to energize at least one of the electromagnets for generating a stationary magnetic field in an operating mode of the device.

5. The jetting device according to claim 3, wherein the magnetic field generator includes at least one permanent magnet.

* * * * *